(12) United States Patent
Bao

(10) Patent No.: US 9,227,534 B2
(45) Date of Patent: Jan. 5, 2016

(54) SEAT APPARATUS FOR A CHILD'S RIDE-ON VEHICLE

(71) Applicant: PlaSmart, Inc., Ottawa, Ontario (CA)

(72) Inventor: Honghzi Bao, Huangyan (CN)

(*) Notice: Subject to any disclaimer, the term of this patent is extended or adjusted under 35 U.S.C. 154(b) by 0 days.

(21) Appl. No.: 14/035,299

(22) Filed: Sep. 24, 2013

(65) Prior Publication Data
US 2014/0021767 A1 Jan. 23, 2014

Related U.S. Application Data

(63) Continuation of application No. 12/768,791, filed on Apr. 28, 2010, now Pat. No. 8,567,803.

(51) Int. Cl.
*B60N 2/26* (2006.01)
*B62K 9/00* (2006.01)

(52) U.S. Cl.
CPC .... *B60N 2/26* (2013.01); *B62K 9/00* (2013.01)

(58) Field of Classification Search
CPC ....... B62K 9/00; B62M 1/00; A63C 17/0033; B60N 2/26
USPC ............ 280/218, 210, 87.021, 215.1, 215.11, 280/215.12
See application file for complete search history.

(56) References Cited

U.S. PATENT DOCUMENTS

| | | | |
|---|---|---|---|
| 3,663,038 A * | 5/1972 | Hendricks | 280/218 |
| 5,046,750 A * | 9/1991 | Heubl | 280/87.021 |
| 5,474,483 A * | 12/1995 | Sun | 446/71 |
| D418,546 S * | 1/2000 | Jones et al. | D21/424 |
| D448,430 S * | 9/2001 | Wang | D21/433 |
| D453,538 S * | 2/2002 | Tseng | D21/433 |
| 6,499,755 B2 * | 12/2002 | Gu | 280/210 |
| 6,641,456 B2 * | 11/2003 | Wang | 446/440 |
| 6,722,674 B2 * | 4/2004 | Gu et al. | 280/87.021 |
| 6,860,497 B2 * | 3/2005 | Wang | 280/87.021 |
| 6,875,158 B2 * | 4/2005 | Wang | 482/51 |
| D518,417 S * | 4/2006 | Oosterveer | D12/112 |
| 7,086,657 B2 * | 8/2006 | Michelau et al. | 280/282 |
| 7,222,871 B2 * | 5/2007 | Michelau et al. | 280/293 |
| 8,262,114 B2 * | 9/2012 | Jessie, Jr. | 280/279 |
| 2001/0040352 A1 * | 11/2001 | Wang et al. | 280/87.01 |
| 2004/0080139 A1 * | 4/2004 | Kettler et al. | 280/293 |
| 2006/0001234 A1 * | 1/2006 | Michelau et al. | 280/282 |

* cited by examiner

*Primary Examiner* — Kevin Hurley
*Assistant Examiner* — Michael Stabley
(74) *Attorney, Agent, or Firm* — Jeffrey Sonnabend; SonnabendLaw

(57) ABSTRACT

A seat member for use with a child's scooter vehicle for preventing the unintended flipping over of the scooter. The seat member having a body portion having opposing top and bottom surfaces and front and back surfaces. The seat member includes a generally planar seat surface on the top surface of the body portion and a projection member provided on the top back surface of the body portion. At least a portion of the projection member extends into the generally planar seat surface configured to prevent a user from leaning too far backwards on the seat member thus preventing the unintended flipping over of the scooter.

2 Claims, 7 Drawing Sheets

SEAT APPARATUS FOR A CHILD'S RIDE-ON VEHICLE

FIELD OF THE INVENTION

The invention relates to a child's ride-on vehicle, and more specifically, to a safety seat for use with a child's ride-on vehicle.

BACKGROUND OF THE INVENTION

The unintended tipping over of a child's riding toy vehicle is a serious issue requiring the publication of consumer safety standards to prevent such occurrences. For instance, article F963 of the American Society for Testing and Materials (ASTM) sets forth requirements (section 4.15.3) relating to the stability of forward and backward directional movement of a child's ride on toy. Article F963 is incorporated by reference in its entirety.

With regards to prior art children's riding toy, such a child's ride-on vehicle is shown in FIG. 1. Illustrated is a scooter having a scooter body (10) with a pair of rear wheels (12, 14) rotatably supported to a rear portion of the body (10). A seat member or defined seat portion (16) is typically provided on a rearward portion of the body (10). A transmission unit (18) having an upper control portion is positioned above the body (10), the transmission unit (18) also has a lower connecting portion extending underneath the body (10). A steering member (20) is connected to the upper control portion of the transmission unit (18) being operable to rotate the lower connecting portion of the transmission unit (18) in clockwise and anti-clockwise directions. A twister member (30) is provided which includes a driven portion connecting to the lower connecting portion of the transmission unit (18). A pair of driving wheels (21,22) are spacedly and rotatably mounted to the twister member (30) wherein the two driving wheels (21,22) are spaced from the driven portion of the twister member (30). Safety driving equipment is provided which includes a supporting arm (26) frontward extending from the driven portion of the twister member (30). A safety wheel (28) is rotatably mounted to a free end of the supporting arm (26) to support a front portion of the body (10) to prevent the child's ride-on vehicle from flipping over "frontwards" when the child's ride-on vehicle is in use.

Thus, the above described child's ride-on vehicle body (10) includes structure for preventing the child's ride-on vehicle from flipping over its front driving wheels (22,24) when a child moves too far forward relative to the child's ride-on vehicle. However, it does not include structure from preventing the child's ride-on vehicle from flipping over "backwards" when a child moves too far backwards relative to the child's ride-on vehicle.

SUMMARY OF THE INVENTION

In one aspect of the invention, a seat member for a child's scooter vehicle is described for preventing the unintended flipping over of the scooter. The seat member includes a body portion having opposing top and bottom surfaces and front and back surfaces. The seat member defines a generally planar and/or slightly curved seat surface on the top surface of the body portion and a projection member provided on the top back surface of the body portion. The generally planar seat surface encompasses any surface suitable for sitting on. At least a portion of the projection member may extend into the generally planar seat surface configured to prevent a user from leaning too far backwards on the seat member thus preventing the unintended flipping over of the scooter.

BRIEF DESCRIPTION OF THE DRAWINGS

The objects and features of the invention can be understood with reference to the following detailed description of an illustrative embodiment of the present invention taken together in conjunction with the accompanying drawings in which:

FIGS. 7 and 8 are front and back elevational views of the seat apparatus depicted in FIG. 3.

WRITTEN DESCRIPTION OF CERTAIN EMBODIMENTS OF THE INVENTION

The present invention is now described more fully with reference to the accompanying drawings, in which an illustrated embodiment of the present invention is shown. The present invention is not limited in anyway to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Figure 1:
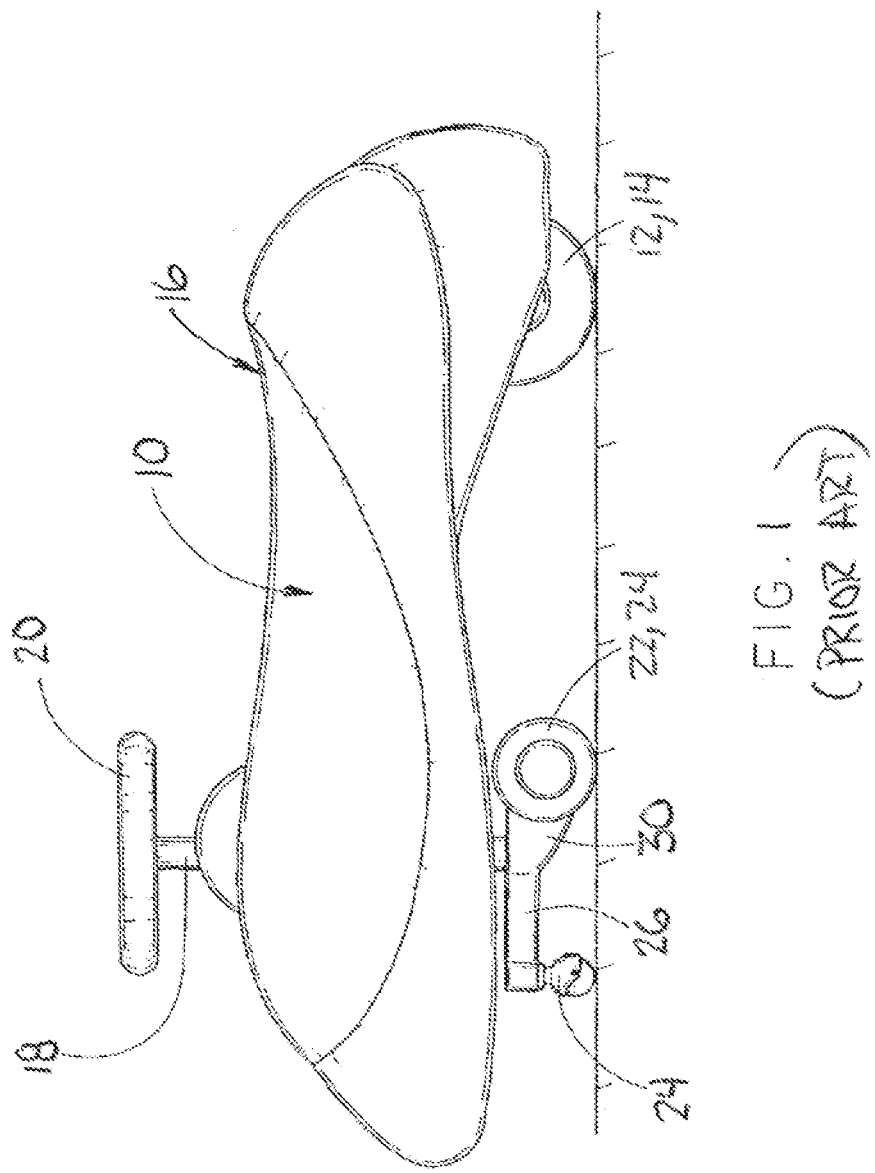
FIG. 1 is a side-elevational view of a prior art child's scooter.
Figure 2:
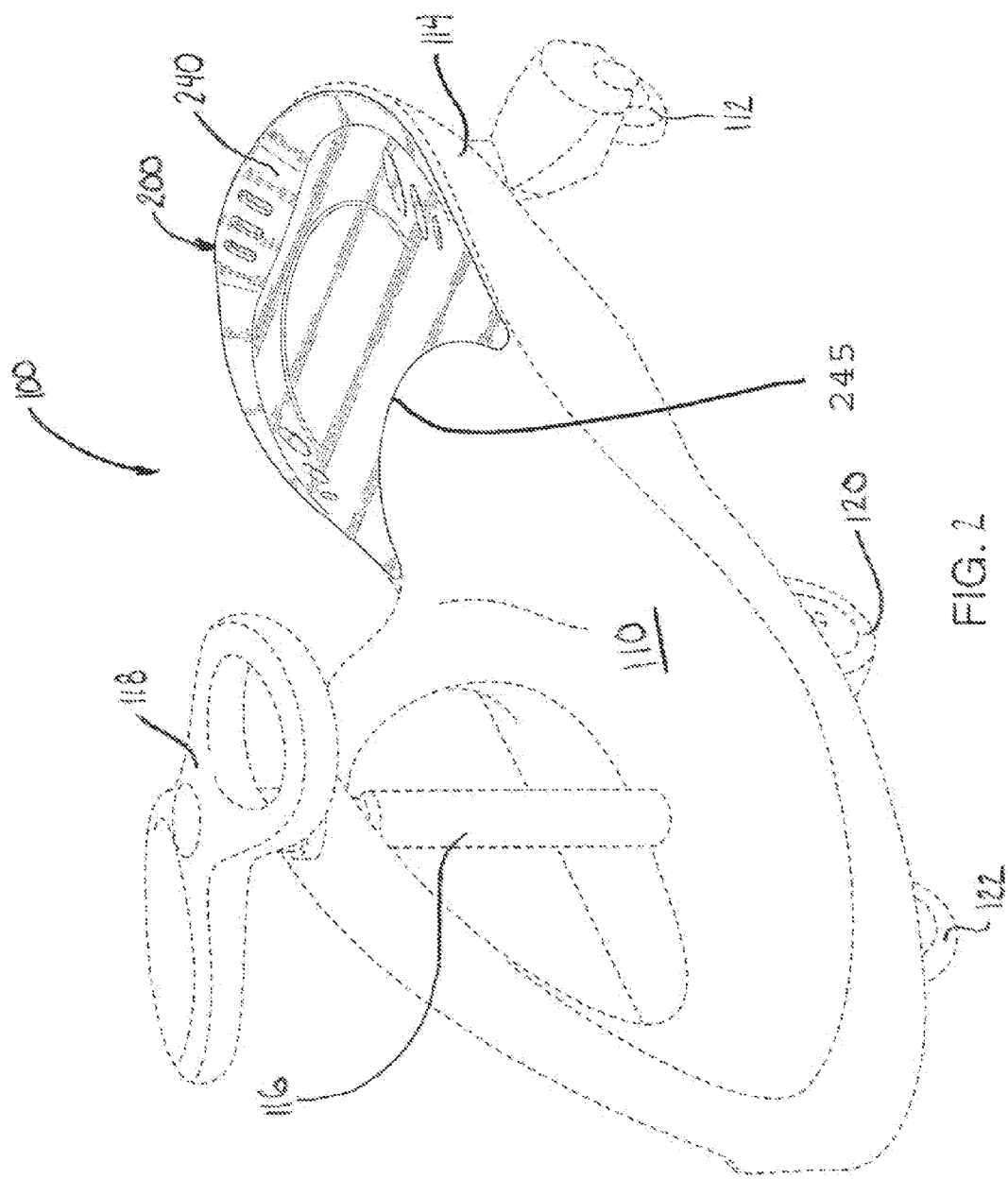
FIG. 2 is a perspective view of a scooter body affixed to a seat apparatus in accordance with an illustrated embodiment of the invention.
Figure 3:
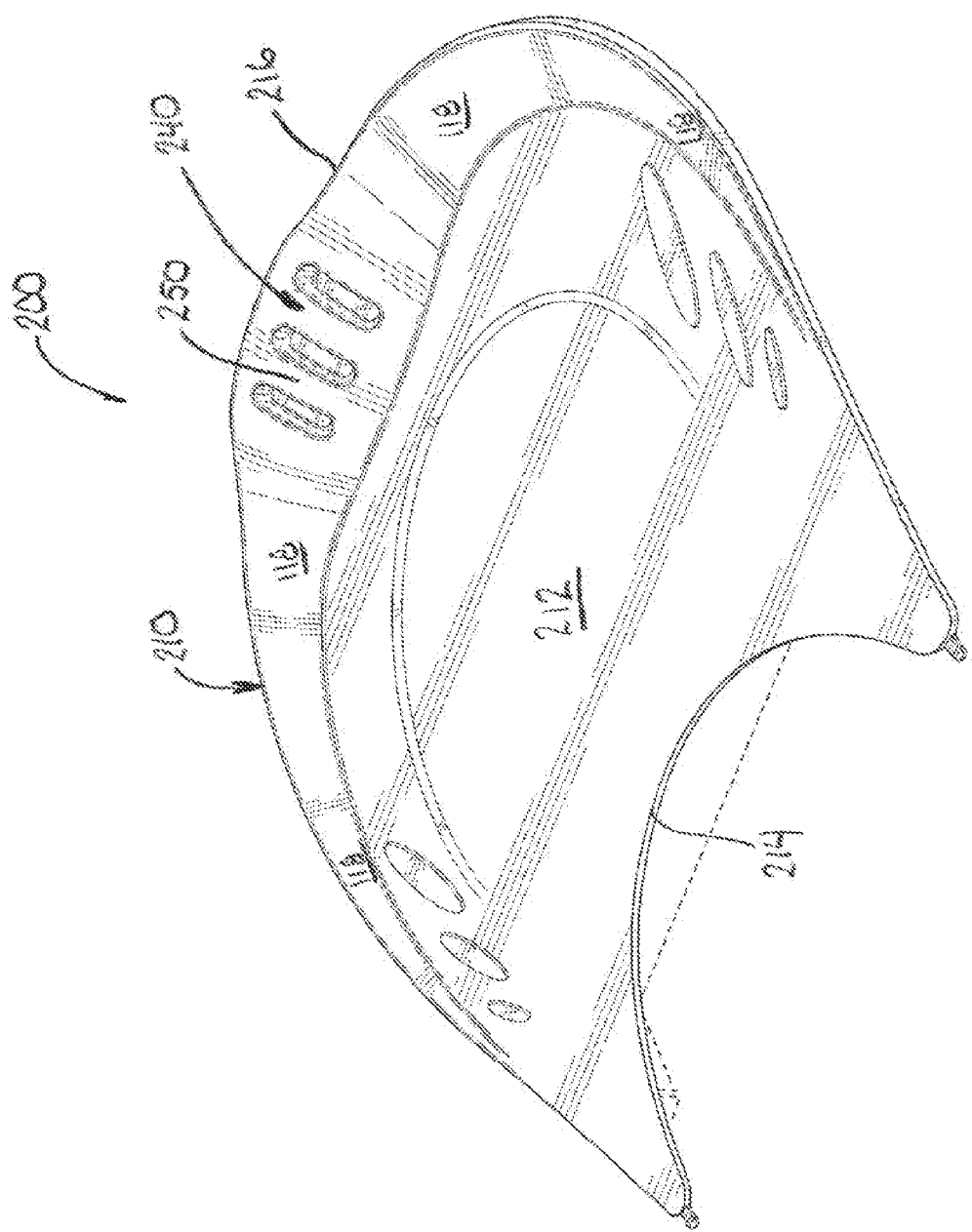
FIG. 3 is a top perspective view of the seat apparatus depicted in FIG. 2.

With reference to FIG. 2, a seat member 200 is shown in accordance with an illustrated embodiment of the invention. As to be discussed further below, seat member is configured to reduce the occurrence of, and in some cases prevent, a "scooter" (that is, a ride on vehicle 100), from flipping or tipping over backwards when a child moves too far backwards relative to the scooter body 110.

Such a scooter 100 typically includes a body portion 110 having a pair of rear wheels 112 rotatably supported at a rear portion 114 of the body 110. Seat member 200 is also preferably affixed in the rear portion 114 of the body 110. Seat member 200 will be discussed in further detail below.

Body portion 110 further includes a transmission unit 116 having an upper control member positioned above the body 110 and a lower portion connected preferably to a twister member (not shown) extending underneath the body 110. A steering member 118 is affixed to the upper control member intended to be manipulated by a user in a clockwise or counterclockwise direction causing corresponding rotation of the connected twister member via the transmission unit 116. The twister member includes a pair of driving wheels 120 spacedly and rotatably mounted thereon and spaced from the transmission unit 116. Safety driving equipment having a supporting arm (not shown) frontward extends from the twister member, which has at least one safety wheel 122 rotatably mounted to a free end of the supporting arm to prevent flipping over of the scooter 100 when a user moves too far forward relative to the scooter body 110.

With reference now to FIGS. 2-9 (and with continuing reference to FIG. 2), the seat member 200 is configured for reducing the occurrence of a scooter 100 from flipping over backwards relative to its rear wheels 112. It is also to fee appreciated that the above described scooter body 110 illustrated in FIG. 2 is to be understood as exemplary of a scooter body to which the seat member 200 may be used with for reducing the occurrence of backwards flipping or tipping over of such a scooter body when a user moves (such as shifting his/her weight) too far backwards. In other words, seat member 200 in accordance with the present illustrated embodiment is to be understood to be intended to be used with differently configured child's scooters where the backwards flipping over of such a scooter is an issue when a child moves too far backwards on the scooter.

Seat member 200 includes a body portion 210 defining a generally planar seat region 212 having opposing front 214 and rear portions 216. The generally planar seat surface 212 is to be understood to encompasses any surface suitable for sitting on. The body portion 210 is configured to affix to the body 110 of a scooter 100 using known affixation techniques such as glue, plastic welding, snap-fit, tab and slot and the like. Seat body portion 210 includes a continuous raised edge portion 218 extending from the circumferential side portions of the generally planar seat region 212 and around the rear portion 218 of the seat body portion 210. The raised edge portion 218 defines an inclined surface angled upwards relative to the generally planar seat region 212. The raised edge portion 218 is configured and operable to retain a child, and more specifically, to retard a child from moving or slipping off the generally planar seat region 212 via its inclined surface when the child is positioned on the scooter body 110.

Figure 4:
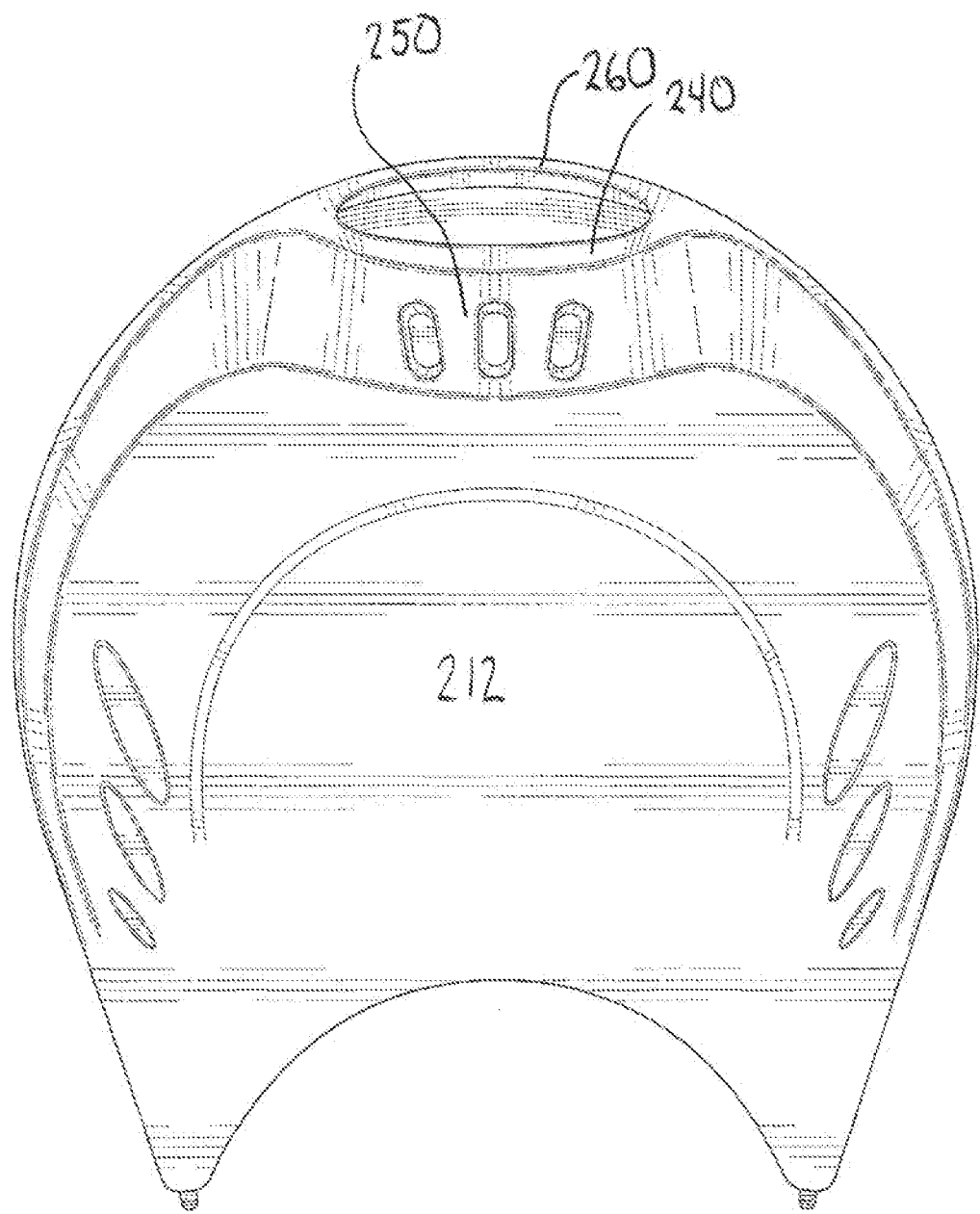
FIG. 4 is a top planar view of the seat apparatus depicted in FIG. 3.
Figure 5:
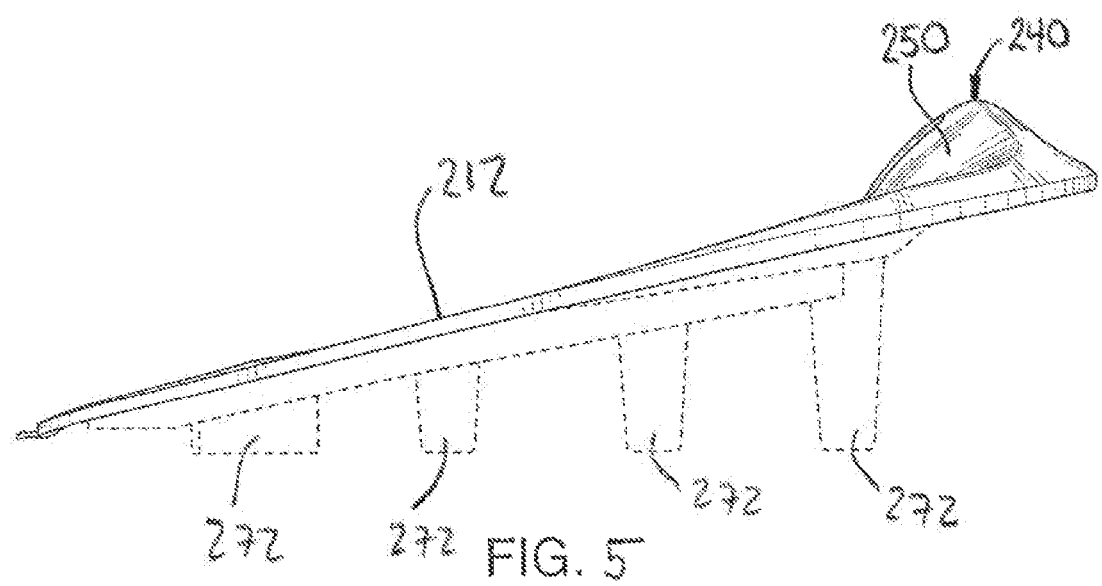
FIGS. 5 and 8 are left and right side elevational views of the seat apparatus depicted in FIG. 3.
Figure 6:
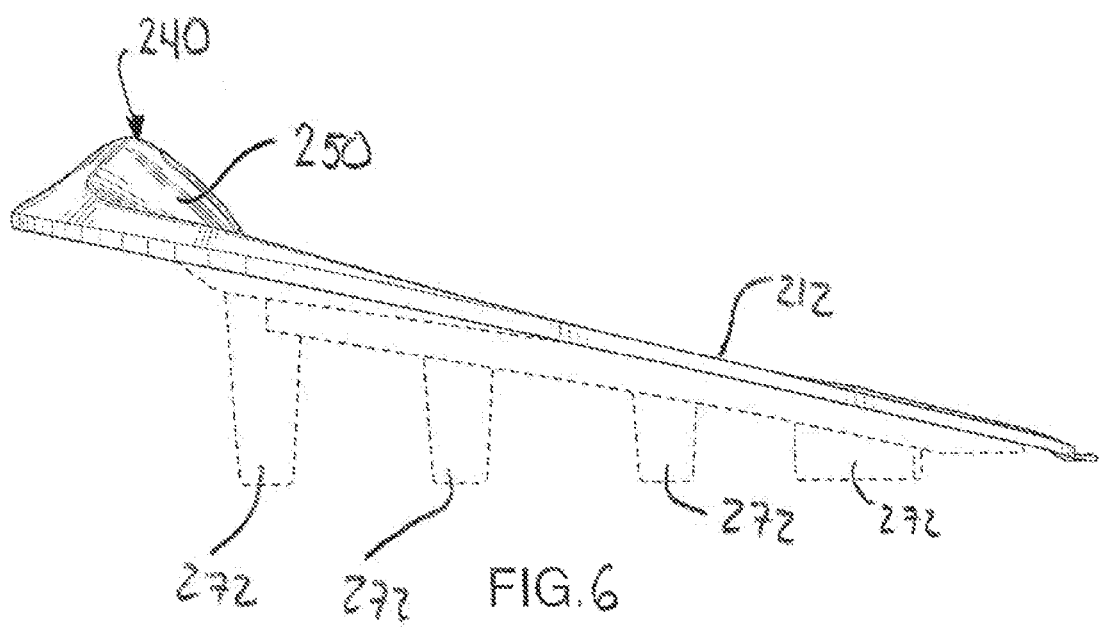
Figure 7:
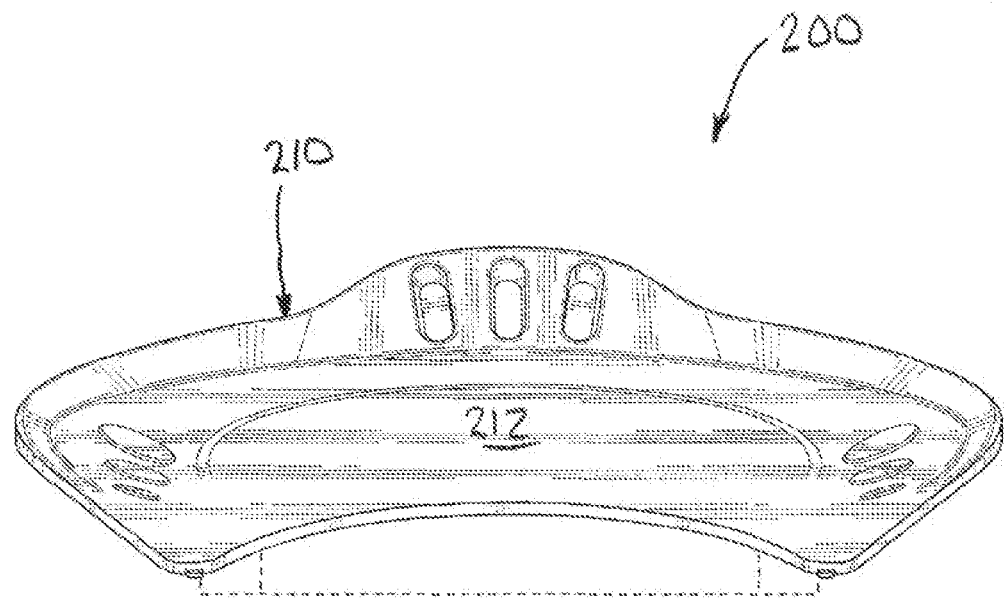
Figure 8:
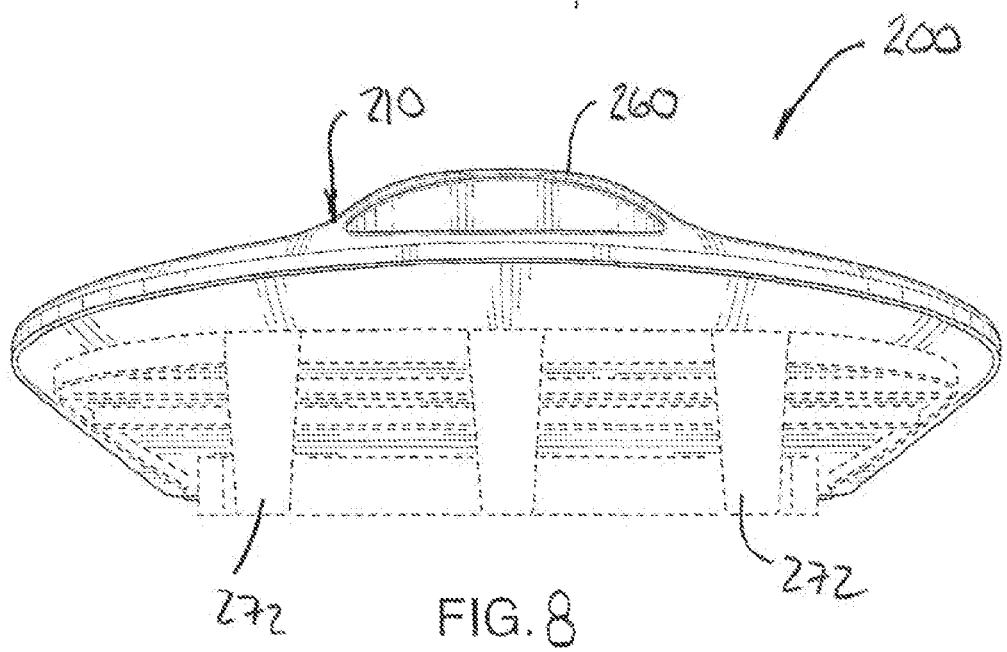
Figure 9:
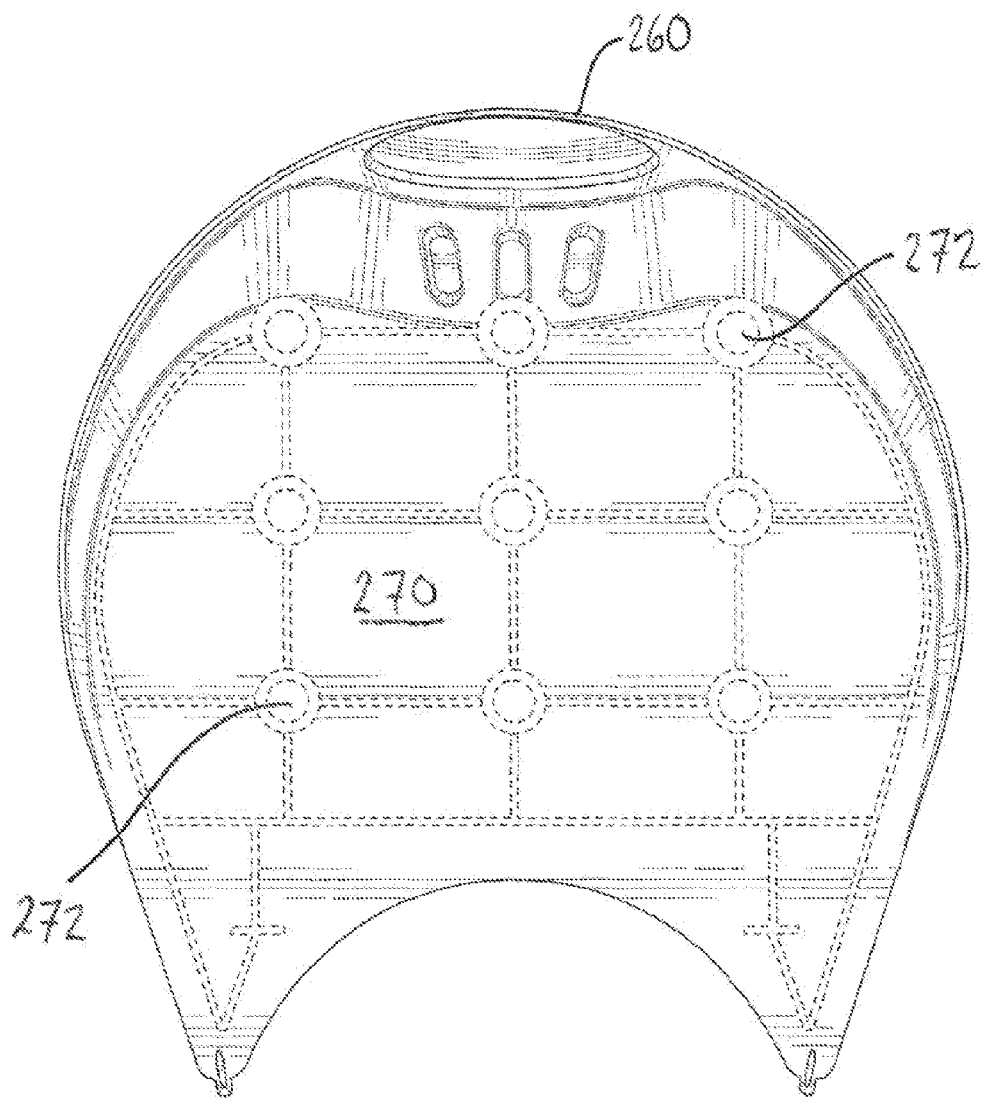
FIG. 9 is bottom planar view of the seat apparatus depicted in FIG. 3.

To reduce the unintended occurrence of a child from flipping or tipping over backwards on the scooter 100, the seat member 200 includes a rear projection member 240 for preventing a child from leaning too far backwards on the scooter 100. As best shown in FIGS. 4-6, the rear projection member 240 extends into the generally planer seat region 212 and includes a raised inclined surface 250 extending above the aforesaid raised edge portion 218. The raised inclined surface 250 is configured and operable as an obstruction surface for obstructing a child from leaning too far backwards on the seat 200 causing the scooter 100 to flip over backwards. In use, when a child is positioned on the seat 200 and starts to lean backwards or shift his or her weight too far towards the rear, the lower back portion of the child will come, in contact with the raised inclined surface 250 of the rear projection member 240 preventing any further leaning backwards of the child, thus reducing the occurrence of the flipping or tipping over backwards of the scooter 100. Arcuate portion 245 faces frontward and interfaces seat member 200 with scooter 100.

More specifically, the mass (weight) of a child creates a downward force on the scooter body through the scooter seat. The wheels act as a fulcrum (also called a pivot) about which the scooter seeks to rotate as a load (the child's mass/weight) is placed on the seat. The seat and/or body of the scooter act as a lever-arm functionally connecting the load to the fulcrum. The tendency of the scooter to rotate about the wheels (i.e., the torque) is directly proportional to the length of the lever-arm, that is, the distance of the child from the fulcrum measured linearly from the point directly over the wheels. When the child sits forward of the rear wheels, the lever-arm extends frontward (i.e., towards the front wheels), in which case forward rotation (torque) of the scooter is prevented by the front wheels contact with the ground. However, when the child sits rearward of the rear wheels, the lever-arm extends rearward and the scooter tends to rotate (torque) rearward (tip over backwards). Embodiments of the instant. Invention tend to significantly minimize or eliminate this latter situation by maintaining a child's weight sufficiently over or forward of the rear wheels to prevent or greatly minimize a significant rearward lever-arm and resulting rearward torque.

A rear portion of the rear projection member 240 also preferably defines a handle portion 280 which may be used by an adult to control movement of scooter 100 when ridden by a child. The handle portion 260 may also be used by an adult for transporting scooter 100 when not being used by a child. Handle portion 280 is preferably formed unitary with seat body 210 having a semicircular shaped slotted opening 282. As best shown in FIG. 4, in close proximity to the handle portion 280 is a plurality of open slots 284, each preferably having a semicircular shape, extending from a front surface to a rear surface of seat body 210.

With primary reference to FIGS. 5, 6, 8 and 9, the bottom surface 270 of seat body member 210 also preferably includes a plurality of downward projection elongated members 272 each configured to affix within a respective reception region defined in the scooter body 110 for affixing the seat body member 210 to the scooter body 110.

Other embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention has been described, it should be understood that various changes, substitutions, and alterations can be made by one of ordinary skill in the art without departing from the scope of the present invention.

What is claimed is:

1. A seat member for use with a scooter body, the seat member including:
    a body portion having opposing top and bottom surfaces and front and back surfaces;
    a seat surface on the top surface of the body portion;
    a rear projection member provided on the top back surface of the body portion defining a surface projecting outward from the seat surface, wherein the surface projecting outward has a radius extending about a point located within the seat surface; and
    a frontward facing arcuate portion located on said rear projection member, wherein the frontward facing arcuate portion has a radius extending about a point located rearward of the seat surface and bulges in a forward direction.

2. A seat member for use with a scooter body, the seat member including:
    a body portion having opposing top and bottom surfaces and front and back surfaces;
    a seat surface on the top surface of the body portion;
    a continuous raised edge portion provided on edge portions of the top surface of the generally seat surface with the continuous raised edge portion including an inclined surface angled upwards relative to the seat surface;
    a rear projection member provided on the top back surface of the body portion defining an inclined portion angled outward from the seat surface, wherein the inclined portion has a radius extending about a point located within the seat surface; and a frontward facing arcuate portion centrally located on said rear projection member and curving toward the seat surface, wherein the frontward facing arcuate portion has a radius extending about a point rearward of the seat surface and bulges in a forward direction.

\* \* \* \* \*